June 20, 1972 L. F. RADKE ET AL 3,671,128
AUTOMATIC CLOUD CONDENSATION NUCLEI COUNTER
Filed Aug. 15, 1969 3 Sheets-Sheet 1

INVENTORS
LAWRENCE F. RADKE
PETER V. HOBBS
BY
Christensen, Sanborn & Matthews
ATTORNEYS

INVENTORS
LAWRENCE F. RADKE
PETER V. HOBBS

INVENTORS
LAWRENCE F. RADKE
PETER V. HOBBS
BY
Christensen, Sexton, & Matthews
ATTORNEYS United States Patent Office 3,671,128
Patented June 20, 1972

3,671,128
AUTOMATIC CLOUD CONDENSATION NUCLEI COUNTER
Lawrence F. Radke, Seattle, and Peter V. Hobbs, Bellevue, Wash., assignors to Battelle Development Corporation, Columbus, Ohio
Filed Aug. 25, 1969, Ser. No. 852,786
Int. Cl. G01n 1/00, 15/00
U.S. Cl. 356—37                8 Claims

ABSTRACT OF THE DISCLOSURE

An apparatus and method for the automatic measurement of the concentration of condensation nuclei contained in an air sample that form cloud droplets under conditions closely approximating those of natural clouds. An air sample containing condensation nuclei is introduced into a thermal diffusion chamber which is maintained at a supersaturation approximating that of natural clouds and the condensation nuclei are allowed to grow to a certain uniform size. The droplet size is measured directly by means of a photocell observing the light scattered by the droplets at a forward angle from a monochromatic light source. When the droplets reach the desired size, an enhancement in scattered light occurs which is detected by the photocell. Alternatively, the droplet size is measured indirectly by a timer which defines a fixed time interval after the air sample introduction, given the supersaturation in the thermal diffusion chamber. An electrical signal from either the photocell or the timer then triggers an integrating nephelometer which simultaneously measures the extinction coefficient due to light scattering of the cloud droplets. The known droplet size and observed extinction coefficient are combined in a simple manner to determine the concentration of cloud condensation nuclei.

BACKGROUND OF THE INVENTION

This invention relates to methods and apparatus for measuring the concentration of cloud condensation nuclei.

The invention described herein was made in the course of or under a grant from the National Science Foundation, an agency of the United States Government.

It is a well-known phenomenon that atmospheric clouds comprise small water droplets which are formed by condensation from atmospheric water vapor under supersaturation conditions. Supersaturation occurs by cooling of the ambient air below its saturation temperature so that the air is supersaturated with water vapor. Generally, clouds are formed by growth of cloud condensation nuclei, which may be particles suspended in the atmosphere, into cloud droplets. In natural cloud formations, maximum initial supersaturations in the order of 1% are all that is required for formation of cloud droplets.

The concentration in the atmosphere of condensation nuclei may be determined by using an expansion chamber in which a water vapor supersaturation on the order of 100% is achieved by the rapid expansion of a saturated sample of air, thereby causing condensation on the condensation nuclei present. The concentration of condensation nuclei is then measured either by visually counting the number of droplets present in the expansion chamber or by indirectly measuring the number of droplets by using light-scattering techniques.

The technique of visual observation involves the use of microphotography in which the cloud droplets are photographed. The concentration of condensation nuclei is obtained by counting the number of water droplets which can be seen over a given area of the photograph. One of the major disadvantages of this method is that it is extremely tedious, time-consuming, and incapable of providing the concentration of condensation nuclei in the air sample in real time.

Measuring the concentration by light scattering involves irradiating the air sample containing cloud droplets from a suitable light source, then measuring the intensity of the radiation scattered by the cloud droplets by means of a suitable detector, such as a photocell. Although providing a real time measurement of the concentration, this method and implementing apparatus are subject to serious theoretical and practical difficulties. Scattered radiation does bear a relationship to the concentration of condensation nuclei, but these prior instruments and methods have been incapable of precisely delineating that relationship. Even if it is assumed that the amount of scattered light increases in direct proportion to the concentration of cloud droplets, the absolute accuracy of any device measuring scattered radiation cannot be known, since no theoretical check on the results is available, and calibration must be periodically made against a measurement made by the time-consuming microphotographic process. The assumption of linearity between light scattering and the concentration of cloud droplets is also open to question. Thus, it has been recognized in the prior art that with an expansion chamber, there exists only a certain time period in which a linear relationship exists and during which the measurement of scattered light must be made.

Another, more serious objection to light scattering techniques lies in the indiscriminate monitoring of light scattering without respect to the size or chemical properties of the scattering cloud droplets. Generally, prior devices measure the light scattering only at a single, forward angle from the incident beam, or at a plurality of discrete angles. As the size of the cloud droplet increases, the type of light scattering therefrom varies greatly. That is, two droplets of a given size could scatter more light in a forward direction than a larger droplet which uniformly scattered light in all directions. Thus, by neglecting these non-isotropic differences in scattering properties of different-sized water droplets, errors are introduced into measurement of condensation nuclei concentration.

The most serious objection to these prior techniques lies in the use of the expansion chamber. To accurately obtain a given supersaturation, it is assumed that the process involved is adiabatic, that is, without loss of heat. Such a process is physically impossible with containers of a size previously used, since those containers have walls and since the walls conduct heat from the interior thereof.

In addition, these chambers produce condensation by the use of supersaturations on the order of 100%. Measurements of condensation nuclei at supersaturations of this magnitude are of little relevance to natural atmospheric condensation in clouds and fogs. In natural clouds, the supersaturation seldom exceeds a few percent, and the activated nuclei upon which cloud droplets form number only in the range of 10 cm.$^{-3}$ to little more than $10^3$ cm.$^{-3}$. Typically, this concentration is less than 1% of the available condensation nuclei in the fluid sample. On the other hand, with supersaturations on the order of 100%, the prior expansion chambers form cloud droplets on practically every particle within the air sample, from the largest particles whose radius is in the order of 1.0 $\mu$n. or larger, down to particles sized in the ionic range.

Thus, in actual clouds, cloud droplets form only on certain condensation nuclei. These particles will be hereinafter referred to as cloud condensation nuclei or CCN, defined as the nuclei in an air sample which will grow by condensation to exceed a critical size at supersaturations found in natural clouds. The expansion chamber methods previously related, while they may indicate the numerical concentration of condensation nuclei, do not allow measurement of the number of condensation nuclei that will be active at any given saturation in a cloud, or the number of CCN. Therefore, the thermal diffusion chamber long used in nuclear physics has been adapted for CCN measurements. A thermal diffusion chamber may comprise a short cylinder whose ends are covered by metallic plates. The surface of each plate facing the cylinder is covered with a moisture-retaining material, such as blotting paper, which is wetted. The bottom plate is maintained at a temperature considerably lower than the top plate so that a vertical gradient of temperature is established in the cylinder. When the air sample is introduced into the cylinder, the combination of the linear temperature gradient and the nonlinear behavior of the saturation vapor pressure of water with temperature produces a supersaturated region in the cylinder which is a maximum slightly above the center of the cylinder and which decreases to zero at the two metallic plates.

The major advantage of the thermal diffusion chamber over an "adiabatic" expansion chamber in cloud condensation nuclei measurements is that the former produces a theoretically predictable and lower supersaturation which approximates that occurring in natural clouds. Slow eddy-type motions in the cylinder expose, in a relatively short period of time, all of the condensation nuclei to the region of maximum supersaturation. The number of cloud droplets that appear in the chamber is therefore equal to the concentration of CCN at the maximum supersaturation in the chamber.

While producing accurate CCN counts, the thermal diffusion chambers of the prior art have been subject to some of the errors and problems of the earlier expansion chambers, for most instruments embodying thermal diffusion chambers have used a visual counting method for a detection system. One of these methods is to place a lacquered slide in the diffusion chamber, and to count the droplet imprints thereon. Another common visual detection technique is the aforementioned microphotographic process, in which a strong, sharply-defined beam is cast into the chamber and the illuminated droplets are photographed. Concentration of CCN is then determined by visually counting the photographed droplets.

These visual methods, while producing accurate concentration figures for CCN, again involve tedious implementation and non-real time determinations. Attempts have been made to automate the counting process by a beam-breaking technique, in which the cloud droplets are transported past a light source-photocell combination and thereby counted. Serious errors are introduced into the count, due to the necessity of passing the cloud droplets through a given geometric area defined by the light beam from the light source.

It is thus an object of this invention to provide an apparatus and method for the simple, speedy, and yet accurate determination of concentration of cloud condensation nuclei that will actually form cloud droplets under conditions approximating those of natural clouds.

It is a further object of this invention to provide means for automatically measuring the concentration of cloud condensation nuclei produced at low supersaturation in a thermal diffusion chamber.

It is yet a further object of this invention to provide a cloud condensation nuclei counter which furnishes reproducible, easily correlated measurements of CCN concentrations and which can be readily calibrated without reference to microphotographic techniquts.

SUMMARY OF THE INVENTION

These objects and others which will become apparent from a consideration of the following specification are achieved, according to one embodiment of the invention, by introducing an air sample containing condensation nuclei into a thermal diffusion chamber maintained at a supersaturation approximating that of a cloud, then measuring the extinction coefficient due to light scattering of the air sample at a time when the mean radius of the cloud droplets is known.

BRIEF DESCRIPTION OF THE DRAWINGS

The subject matter of the invention is particularly pointed out and distinctly claimed in the concluding portion of the specification. For a complete understanding of one embodiment of the invention together with further objects and advantages thereof, reference should be made to the following descriptions taken in conjunction with the accompanying drawings in which:

DESCRIPTION OF A PREFERRED EMBODIMENT

Figure 1:
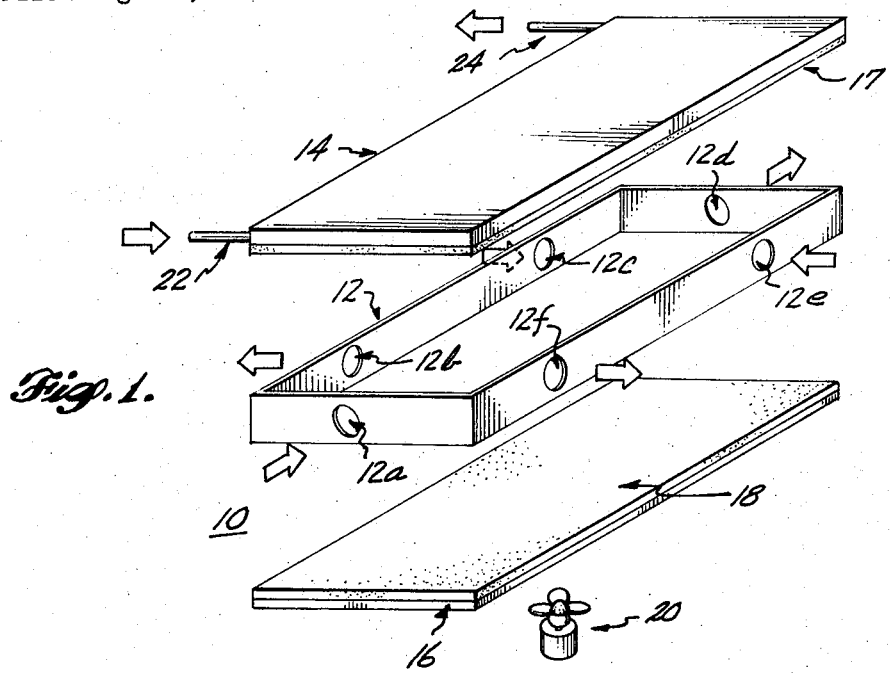
FIG. 1 is a pictorial diagram of a thermal diffusion chamber suitable for use in this invention.

Referring now to FIG. 1, illustrated therein is a thermal diffusion chamber 10 suitable for use in measurements of cloud condensation nuclei. Chamber 10 includes a central portion 12 which comprises an open-ended rectangular box of insulating material having a plurality of openings 12a, 12b, 12c, 12d, 12e, and 12f located in the side walls thereof. In the preferred embodiment, central portion 12 is three inches high, and twelve inches x twenty-four inches in size. Central portion 12 is provided with a top plate 14 and a bottom plate 16. The surfaces of plates 14 and 16 facing the interior of central portion 12 are provided with coverings of moisture-retaining material 17 and 18, respectively. Coverings 17 and 18 may be blotter paper or felt. A system of feed water pipes, not illustrated, irrigates coverings 17 and 18 to maintain them saturated with distilled water.

Bottom plate 16 may comprise a thick piece of aluminum which is maintained at ambient temperature by means of a fan 20 directing environmental air thereat. Top plate 14 is maintained at a substantially higher temperature and comprises a flat, hollow metal container into which warm water of a desired temperature is introduced at orifice 22 and is exited at orifice 24. The temperature of the water flowing through top plate 14 may be maintained constant by a feedback temperature controller.

The theoretical approach to the measurement of cloud condensation nuclei concentration embodied in the apparatus of FIG. 2 will be explained in more detail hereinafter. It is sufficient to note at this point that it is desirable that the cloud droplets that will be formed in thermal diffusion chamber 10 approach a uniform size within a given time period. As noted previously, cloud droplet formation begins when an air sample containing condensation nuclei is placed in contact with supersaturated water vapor, such as produced in the thermal diffusion chamber 10. To insure this uniform size, the droplet formation should begin on all cloud condensation nuclei as nearly simultaneously as possible, that is, the CCN should start growing at the same time. Thus, thermal diffusion chamber 10 is evacuated before any measurements are taken and a new air sample is introduced within a short time. In FIG. 1 exhaust of air is made by suitable means through apertures 12b, 12d, and 12f, and inlet of air is made through apertures 12a, 12c, and 12e. It should be noted that these apertures are spaced symmetrically around central portion 12 to insure uniform inlet and exhaust. With such a procedure, supersaturation and a linear temperature gradient are lost in the thermal diffusion chamber 10 for a short period of time, but are re-established quickly due to the large temperature and moisture-producing surfaces 17 and 18 and the relatively small height of central portion 12.

It is a known phenomenon of cloud formation that the rate of increase in the radius of a cloud droplet is inversely proportional to that radius. Even though the droplets which are formed in a thermal diffusion chamber may be initially widely different in size, they will tend toward a uniform size as they grow by condensation. Therefore, the measuring technique of this invention includes a step of introducing an air sample into the thermal diffusion chamber 10, then allowing the CCN to grow for a period of time sufficient to insure that the resultant cloud droplets are monodispersed, that is, they approach a uniform size distribution. In this manner, the concentration of CCN can be precisely and accurately determined by using light-scattering techniques embodied in the apparatus of FIG. 2.

Figure 2:
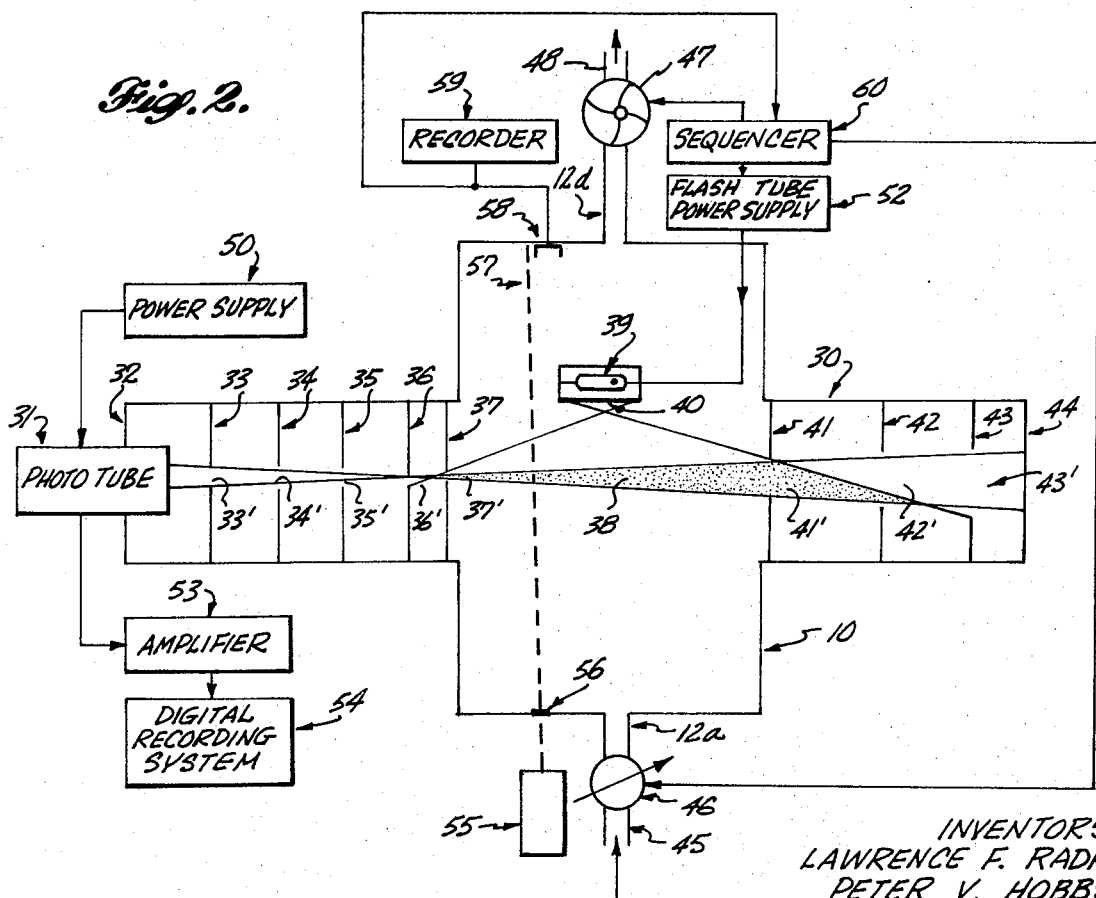
FIG. 2 is a schematic diagram of the cloud condensation nuclei counter.

The cloud condensation nuclei counter in FIG. 2 includes apparatus to determine when the droplets have reached a uniform size, and additionally apparatus to simultaneously measure the light scattered by the droplets over all scattering angles. The thermal diffusion chamber 10 of FIG. 1 is equipped with the aforesaid light-scattering measuring means, which in a preferred embodiment comprises an integrating nephelometer more fully described and claimed in copending application Ser. No. 729,812, filed May 16, 1968, and now Pat. 3,563,-661, Feb. 16, 1971 entitled "Integrating Nephelometer," by Robert J. Charlson and Norman C. Ahlquist, which is assigned to the assignee of the present invention. Reference should be made to that document for additional structural and operational details. Briefly, the integrating nephelometer is a lensless device ideally suited for atmospheric measurements which integrates the light scattered by particles suspended in a fluid sample over all scattering angles to obtain an output signal which is directly proportional to the extinction coefficient due to light scattering. The integrating nephelometer determines this coefficient by implementing the following attenuation equation:

$$I/I_0 = e^{-bx}$$

where:

$I_0$ = intensity of light prior to entering an atmospheric path,
$I$ = intensity of light after passage through an atmospheric path at distance $x$, and
$b$ = extinction coefficient.

The quantity $b$, is made up of two components $$b = b_{abs} + b_{scat}$$

where:

$b_{abs}$ = extinction coefficient due to absorption by particles or gases,
$b_{scat}$ = extinction coefficient due to scattering by particles or gases.

In general, it is possible to assume that $b = b_{scat}$ unless, of course, substantial quantities of light-absorbing gases or particles are present. By using an integrating nephelometer to measure light scattering, rather than a device which measures scattering only at a single or a plurality of discrete angles, errors in readings due to the non-isotropic cloud droplets heretofore mentioned can be avoided.

The integrating nephelometer illustrated in FIG. 2, includes an optical system and an electrical system. In FIG. 2, the optical system is disposed in a tubular container 30 which may be of aluminum or other suitable material. A multiplier phototube 31 is mounted in the forward end 32 of the container 30.

A plurality of discs 33, 34, 35, 36 and 37 are disposed in the container 30 and are arranged to define a collimator and light trap. The discs 33–37 define a series of apertures 33', 34', 35', 36' and 37' which are optically aligned with the phototube 31. A cone of observation 38 is defined by the disc 33 and the disc 36 and does not intersect the edges of apertures 34', 35' and 37'. Discs 34, 35, and 37 serve as light traps and cast shadows on any surfaces seen by the phototube 31. The inside surfaces are preferably all coated with flat, black paint to further reduce the effect of any reflected light.

The air sample is illuminated by a light source 39 and opal glass diffuser or window 40 located in the center section of the tubular container 30. The light source 39 may, for example, consist of a xenon flash-lamp which processes a cosine emission characteristic by means of the opal glass diffuser 40. Diffuser 40 also forms a seal to the diffusion chamber 10. The fact that this geometry, with a cosine emission characteristic, integrates over all scattering angles has been illustrated in the book "Vision Through The Atmosphere" by W. E. K. Middleton (1963).

A second series of discs 41, 42, 43 and 44 are disposed in the rear portion of the tubular container 30 and are separated from the discs 33–37 by the central section of container 30. The disc 41 defines an aperture 41' which further defines the cone of observation 38. Discs 42 and 43 serve as a light trap and define apertures 42' and 43'. The sizes of apertures 42' and 43' are determined by the amount of divergence in the observing beam of the phototube 31. The disc 44 is in the shadow of discs 41, 42 and 43 and is coated with flat, black paint to further prevent direct reflection of light in the direction of the phototube 31.

An inlet duct 45 is provided for admitting air or other fluid to be sampled into the central sampling section of thermal diffusion chamber 10, and an outlet duct 48 is provided for discharging the sampled air after passing through the central section. Inlet duct 45 is coupled to aperture 12a of diffusion chamber 10 through a controllable solenoid valve 46, and aperture 12d of diffusion chamber 10 is coupled to outlet 48 through a controllable pump 47. Apertures 12b, 12c, 12e and 12f are not shown for purposes of clarity.

The electronics system includes a high voltage power supply 50 supplying a well regulated, DC bias voltage to phototube 31. Also included is a controllable, flashtube power supply 52 which supplies a DC pulse to light source 39 upon demand. Upon supply of a light pulse to the interior of thermal diffusion chamber 10, phototube 31 produces a current pulse of a given duration. This current pulse is coupled to an amplifier 53 and a recording system 54. Included in recording system 54 is a scale which is directly proportional to the observed value of the extinction coefficient due to light scattering $b_{Scat}$. Amplifier 53 converts the current pulse from phototube 31 into the extinction coefficient, as more fully described in the aforementioned copending application.

The primary standard for nephelometer calibration is the Rayleigh scattering of particle-free gases such as air, $CO_2$ and Freon. Rayleigh scattering assumes that the extinction coefficient due to light scattering varies as the inverse fourth power of the light wavelength. Initial calibration is made in the laboratory by using these particle-free gases. In addition, this type of nephelometer permits rapid field calibration by monitoring two points on the extinction coefficient scale, one being that obtained from particle-free air which is readily obtainable, and the other being obtained from a secondary standard in the instrument which comprises a white surface whose emission characteristic approximates the extinction coefficient of Freon.

Measurement of droplet size may be made by means of a monochromatic light source 55 whose parallel beam 57 is directed into thermal diffusion chamber 10 through an optical window 56. Beam 57 is directed in the general area of a photocell or light-measuring device 58 which is so situated so as to receive light scattered by the cloud droplets in diffusion chamber 10 at a predetermined forward angle from the axis of beam 57. In the preferred embodiment, monochromatic light source 55 may comprise a helium-argon continuous gas laser. The forward scattering angle is preferably about 20° and the photocell 58 is hooded so as to exclude scattered light from other angles. The output from photocell 58 is connected to a recorder 59 to provide an indication thereof and additionally to a sequencer circuit 60 whose operation and function will be hereinafter described, but which basically provides a periodic, growth of CCN under certain supersaturation conditions and measurement, after a determined time interval, of the light-scattering therefrom. As indicated hereinafter, a simple timer may be substituted for laser 55 and photocell 58.

To fully understand the sequence of measuring, and the relation of the observed value of extinction coefficient and the known value of droplet radius to the concentration of CCN at a given supersaturation, the theory underlying the measuring technique must be considered.

As mentioned previously, measurement of CCN concentration is made at a time when the CCN active at a given supersaturation have grown to water droplets of a predetermined, uniform size. Determination of this size is based on the light-scattering theory of Mie, more fully discussed in Mie, G., Beitrage zur Optik truber Medienspeciell Kolloiodalen Metallasungen, 25 Annalik Physik 377 (1908). According to this theory, if a parallel beam of monochromatic light is directed at a monodispersed cloud of droplets, an interference effect will cause a pronounced enhancement of the scattered intensity as the droplet radius approaches the monochromatic wavelength of the beam.

Figure 3:
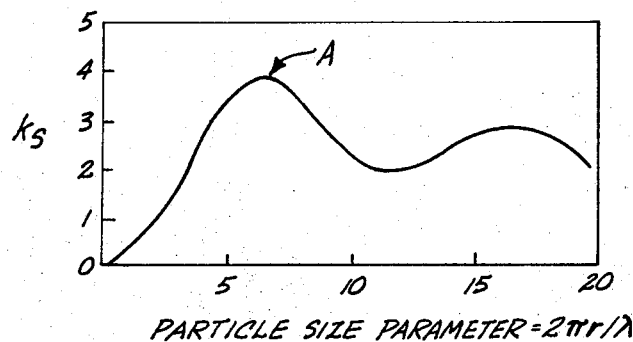
FIGS. 3, 4 and 5 are graphs explaining the operation of the cloud condensation nuclei counter.
Figure 4:
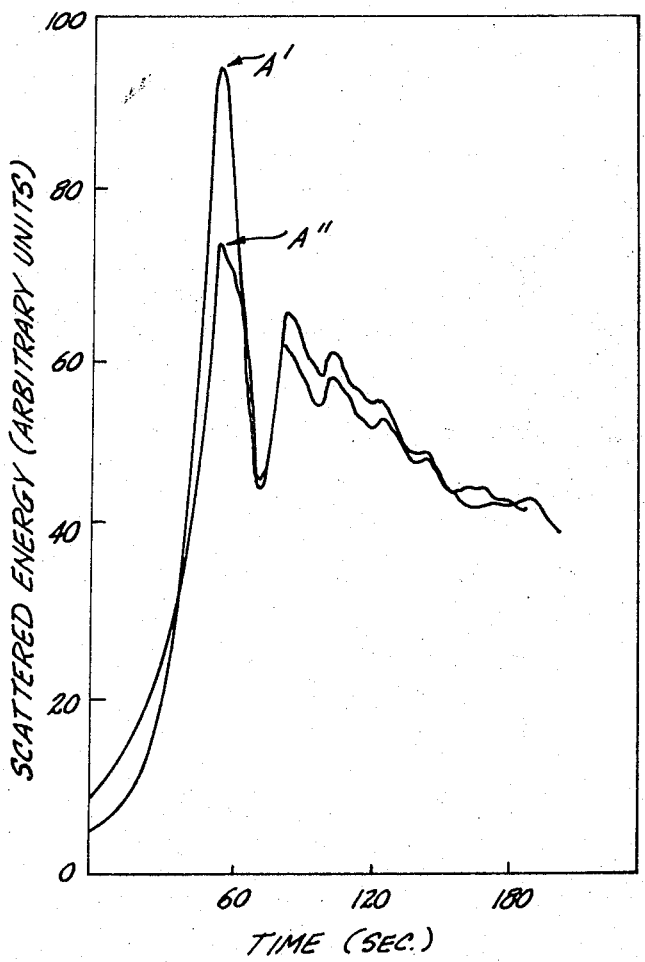

Remembering that the water droplets in the supersaturated sample in thermal diffusion chamber 10 grow from varying initial sizes to a uniform size after a certain time interval, reference should be made to FIG. 3 which illustrates the enhancement in scattered intensity, as represented by a scattering efficiency coefficient $K_S$ to be discussed later, with respect to a particle size parameter proportional to the droplet radius divided by the wavelength of the monochromatic light. The scattered intensity is seen to have a first peak at point A, which may be defined as the first Mie oscillataion. FIG. 4 shows the same curve, but with the time from sample introduction into the thermal diffusion chamber 10 as the abscissa of the plot. What is significant about the curves in FIGS. 3 and 4 is that when the first Mie oscillation occurs, the droplets in the thermal diffusion chamber 10 have obtained a uniform size distribution with a mean radius which may be determined, knowing the wavelength of the monochromatic light source. Accordingly, the frequency of laser 55 may be adjusted so that size measurement may be made by observing the enhancement effect on light scattering by means of photocell 58. For example, if CCN concentration is to be measured at a uniform droplet diameter of 1.2 μn., then, from FIG. 3, $$\frac{2\pi r}{\lambda} = 6.0 = \frac{2\pi (0.6 \ \mu n.)}{6.0} = 0.6 \ \mu n.$$

To determine the CCN concentration, Mie's theory is again used. More precisely, FIG. 3 represents the solution of Mie's equations for a scattering efficiency coefficient $K_s$ as a function of the particle size parameter. The scattering efficiency coefficient is defined as $K_s$ = effective particle scattering area/true area and the droplet particle size parameter = $\frac{2\pi r}{\lambda}$ where $r$ is the droplet radius and $\lambda$ the wavelength of the incident light.

Most important, the oscilations in scattered light energy observed at a given light angle, such as 20° (see FIG. 4), can be used to determine the time necessary for the droplets to grow to a given size. Knowing this uniform size, measurement of the extinction coefficient due to light scattering $b_{scat}$ simultaneously therewith allows a direct computation of the concentration of actual or activated CCN in the fluid sample, by the relation $$N = \frac{b_{scat}}{K_s \pi r^2}$$

where N = concentration of CCN in cm.$^{-3}$.

Sequencer 60 implements this technique in the following manner. Sequencer 60 has as control inputs thereof a cycle start signal and an output signal from the measuring photocell 58. This output signal may be fed, for example, to a simple threshold device in sequencer 60 which indicates when the first Mie oscillation is present, at which time the droplets in the monodispersed cloud sample in thermal diffusion chamber 10 will have grown to a certain uniform size. Sequencer 60 supplies output signals to pump 47, flash tube power supply 52, and controllable solenoid valve 46.

With receipt of the cycle start signal, solenoid valve 46 is opened to couple aperture 12a in thermal diffusion chamber 10 to the ambient through inlet duct 45. At about the same time, sequencer 60 supplies a signal to pump 47 whereby pump 47 replaces the air sample within the diffusion chamber 10 in a short time, by exhaust through aperture 12d and outlet duct 48. The sequencer 60 removes at a given time, output signals from pump 47 and solenoid valve 46 to isolate the thermal diffusion chamber 10 from the atmosphere and thus to provide a time zero for the growth of any CCN therein. Thereafter, the CCN grow into a monodispersed cloud of droplets. When the uniform droplet size approaches the wavelength of beam 57, an enhancement in light scattering is noted by photocell 58 and the output signal therefrom activates the threshold device in sequencer 60. At this time, sequencer 60 provides an output signal to flash tube power supply 52 so that the integrating nephelometer simultaneously measures the extinction coefficient $b_{scat}$ of the air sample. In the embodiment noted, both the size parameter output obtained from photocell 58 and the extinction coefficient obtained from amplifier 53 are noted on recording systems 59 and 54, respectively.

This sequence may be repeated as often as desired by repeating the cycle start signal. The only time limitations are the time necessary for the droplets to grow to a certain uniform size and the slightly longer minimum response time of the CCN counter.

The known value of droplet size and the observed value of the extinction coefficient $b_{scat}$ may thus be manually combined according to the aforementioned relation to give an indication of the CCN concentration N. Alternatively, the calculation may be implemented by means of analog or digital circuitry in which the curve of FIG. 3 giving values of the scattering efficiency coefficient $K_s$ as a function of the particle size parameter is approximated. A simplification can be made if a constant droplet size is used, since the scattering efficiency coefficient $K_s$ is thus known. In this case, the readings of $b_{scat}$ obtained from the integrating nephelometer including amplifier 53 may be directly converted into CCN concentration N by means of multiplication by a simple constant.

Figure 5:
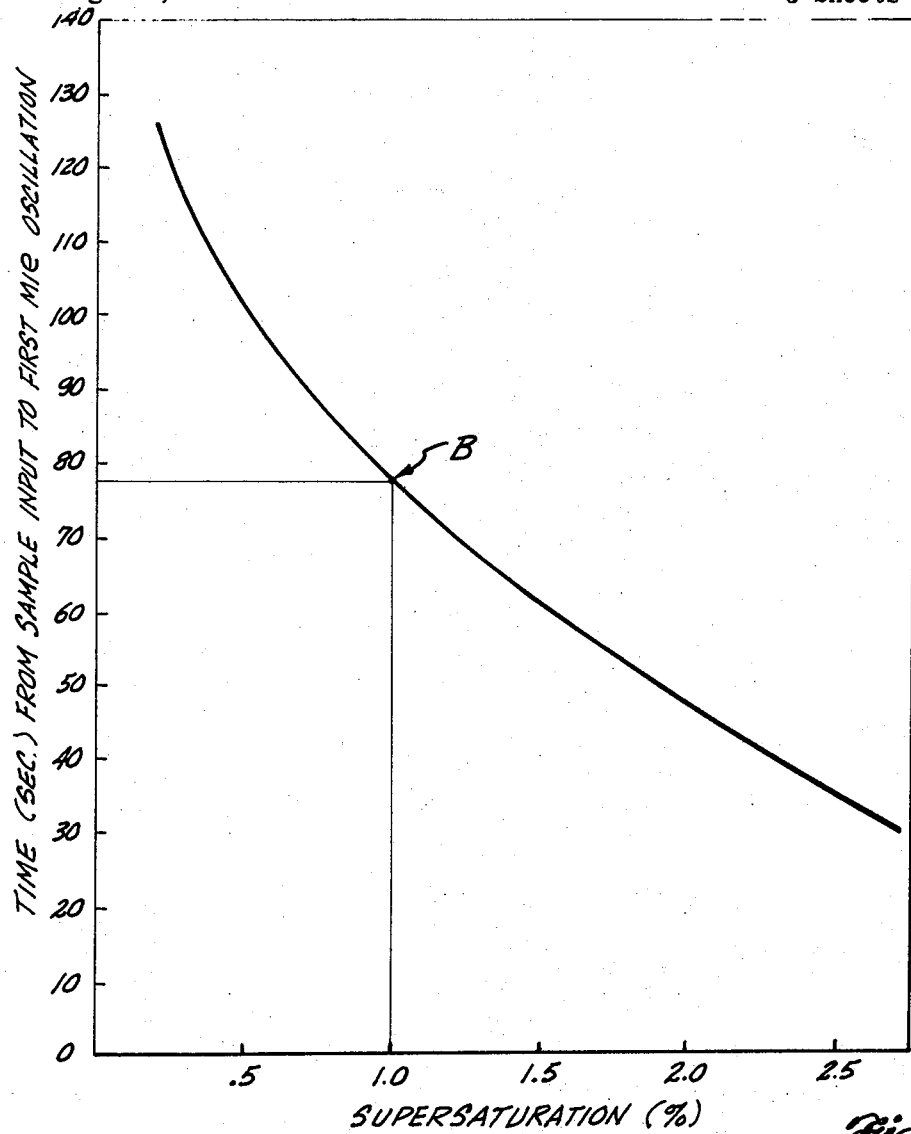

The instrument in FIG. 2 may be further simplified by replacing the monochromatic light source 55 and photocell 58 with a simple timer. FIG. 5 illustrates the experimental results of a series of measurements with the CCN counter of FIG. 2. This curve illustrates that the time from the air sample input to the first Mie oscillation is a known function of the chamber supersaturation. The curves of FIG. 4 indicate that this time does not vary for different CCN concentrations. Accordingly, since the value of supersaturation is usually known, the timer may provide an output pulse to sequencer 60 and thus to flash tube power supply 52 at a predetermined time interval after the sample input. For a supersaturation of 1.0%, a control pulse should be supplied to flash tube power supply 52 about 77 seconds after the closure of solenoid valve 46.

With the apparatus of FIG. 2, the only re-calibration required is in the measurement of the extinction coefficient $b_{scat}$. Original calibration is as folows. First, helium, which has a very small molecular cross section, is introduced into the thermal diffusion chamber 10 in order to determine the noise level and electronic zero for the extinction coefficient measurements. The helium is then replaced by dry, particle-free air. If the nephelometer is near calibration, this step produces a small deflection which may be used as a zero reference point for future field recalibration. Finally, a sample of Freon, which has a very large molecular cross section at atmospheric pressure, is introduced. The light scattering therefrom is equivalent to a CCN concentration N of about 90 1.2 μn. diameter droplets per cubic centimeter. Simultaneously, the electronic gain of amplifier 53 is adjusted so that an indicated value of 90 CCN/cm.$^3$ is indicated. Recalibration may then be effected by using particle-free air and the secondary standard previously described.

The advantages of being able to accurately measure the concentration of efficient cloud condensation nuclei are numerous. For example, an increase in CCN concentration has a measurable effect in influencing an increase in cloudiness in a given geographic area. Therefore, if the CCN concentration is known at a given point, it is possible to predict whether or not cloudiness will occur at locations downwind of that point due to local supersaturated conditions. Likewise, it has been shown that a change in CCN concentration has an effect in influencing rainfall. Rain occurs when cloud droplets coalesce to form larger rain drops which are precipitated. To a point, the probability of rain occurring bears a direct relationship to the CCN concentration. If the number of CCN present in a given area is known, the number of cloud droplets can be predicted as a function of supersaturation conditions. Accurately knowing the CCN concentration also allows more successful implementation of cloud seeding techniques.

Likewise, the ability of the CCN counter of this invention to accurately measure CCN concentration provides a tool for basic research into cloud physics which was not heretofore available, a tool that provides an indication of CCN concentration N in real time which does not involve the tedious, time-consuming process of microphotography for either measurement or calibration.

Figure 6:
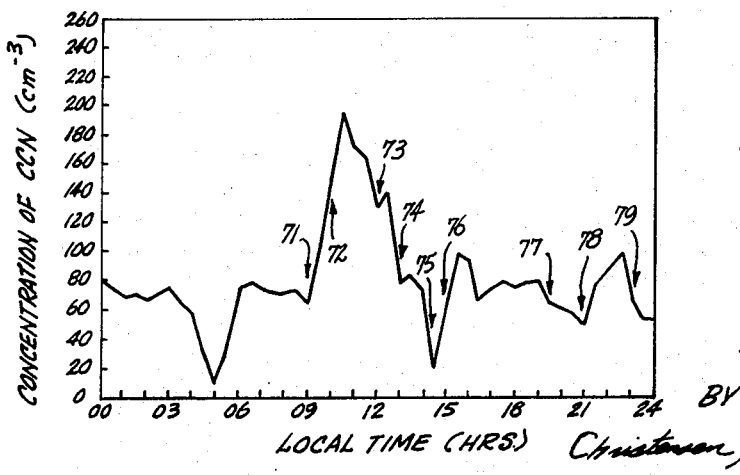
FIG. 6 is a graph of experimental reading of CCN concentration taken over a given 24-hour period.

FIG. 6 illustrates a plot of CCN concentration obtained at an observation station over a 24-hour period. The major dips and rises in this plot were observed to occur during a change in air mass resulting from a storm or other frontal system. Such changes occur during the periods of 03–06, 09–12, 12–15 and 21–24 hours. The very short-term variations in CCN concentration were observed to occur with cumulus cloud formation or breakup. It has been noted that as a cumulus cloud forms, it acts as a sink for CCN in the immediate vicinity. It can be imagined that a cumulus cloud is stationary, with the CCN being blown therethrough by the wind. Thus, at points upwind of the cumulus cloud, the CCN concentration is observed to decrease during the formation process. Such decreases were observed at points 71, 73, 74, 75, 77, 78 and 79 of FIG. 6. On the other hand, when a cumulus cloud is breaking up, the CCN therein dissipate to provide a temporary enhancement in the CCN concentration in adjoining areas. Enhancements in CCN concentration due to this breakup were noted at points 72 and 76.

While this invention has been described with respect to a preferred embodiment and an illustrative example thereof, it is to be clearly understood by those skilled in the art that the invention is not limited thereto and is intended to be bounded only by the appended claims.

We claim:

1. A method for measuring the concentration of cloud condensation nuclei contained in an air sample comprising the steps of:
   (a) introducing the air sample into contact with water vapor at a supersaturation approximating that found in natural clouds,
   (b) maintaining the air sample in contact with said water vapor to allow the condensation nuclei therein to grow by condensation into cloud droplets of a known uniform size,
   (c) directing light at said air sample, and
   (d) measuring the light scattered by said cloud droplets when they have reached said uniform size.

2. The cloud condensational nuclei measuring method of claim 1, wherein the supersaturation is less than 2%.

3. The cloud condensation nuclei measuring method of claim 1, including the step of allowing the condensation nuclei to grow for a period of time measured from the introduction of the air sample, which is determined in part by the supersaturation used.

4. The cloud condensation nuclei measuring method of claim 1, including measuring the scattered light over all scattering angles.

5. An apparatus for determining the concentration of cloud condensation nuclei in the atmosphere, including:
   (a) a thermal diffusion chamber including means maintaining a supersaturation approximating that found in natural clouds therein,
   (b) means introducing a sample of the atmosphere containing cloud condensation nuclei into said thermal diffusion chamber,
   (c) means providing an output signal at a definite time interval after the operation of said sample introducing means, said time interval being in part dependent on the supersaturation maintained in said thermal diffusion chamber, and
   (d) means responsive to said output signal to simultaneously measure light scattered by said cloud condensation nuclei in said thermal diffusion chamber.

6. The apparatus as recited in claim 5, wherein said means for providing an output signal includes a monochromatic light source and a photocell detecting light scattered by said cloud condensation nuclei, said output signal comprising a peak signal from said photocell.

7. The apparatus as recited in claim 5 wherein said scattered light measuring means comprises an integrating nephelometer providing an output corresponding to the extinction coefficient due to light scattering which is measured over all light scattering angles.

8. The apparatus as recited in claim 5, further comprising sequencing means controlling the operation of said sample introducing means, said means for providing an output signal and said scattered light measuring means, by first, second and third control signals, respectively, and having as inputs thereof a cycle signal initiating operation of said apparatus and said output signal, said first signal being produced in response to said cycle signal, said second signal being produced a fixed time after said first signal and said third signal being produced in response to said output signal.

References Cited
UNITED STATES PATENTS

| | | | |
|---|---|---|---|
| 2,684,008 | 7/1954 | Vonnegut | 356—103 X |
| 3,463,589 | 8/1969 | Skala | 356—37 |

OTHER REFERENCES

Squires et al.: "A Comparison of Cloud Nucleus Measurements Over Central North America and the Caribbean Sea," Journal of the Atmospheric Sciences, vol. 23, No. 4, July 1966, pp. 401–404.

RONALD L. WIBERT, Primary Examiner

F. L. EVANS, Assistant Examiner

U.S. Cl. X.R.

73—28; 250—218; 356—103